Patented Apr. 22, 1924.

1,491,572

UNITED STATES PATENT OFFICE.

MARCY H. TROYER, OF LOGANSPORT, INDIANA, ASSIGNOR TO LIBERTY CLEANSER COMPANY, OF LOGANSPORT, INDIANA.

CLEANING AND POLISHING COMPOSITION.

No Drawing.     Application filed June 3, 1922.   Serial No. 565,749.

*To all whom it may concern:*

Be it known that I, MARCY H. TROYER, a citizen of the United States, residing at Logansport, in the county of Cass and State of Indiana, have invented certain new and useful Improvements in Cleaning and Polishing Compositions, of which the following is a specification.

This invention relates to a novel composition of matter for cleaning and polishing surfaces.

The primary object of the invention is to furnish a composition of substances particularly adapted for cleaning and polishing cast iron, porcelain, enameled surfaces and vitreous china plumbing fixtures, although the composition is also useful for cleaning and polishing aluminum-ware, glass baking-dishes, marble, etc.

Another object of the invention is to provide a composition of matter including a substance capable of cutting any dirt or grease on the surface to be cleaned and combined with a substance adapted to smooth and polish the surface while it is being cleaned by the cleaning substance.

A further object of the invention is to provide a composition of finely powdered soda ash and feldspar intimately mixed together and adapted to be applied to the material to be cleaned and polished.

With the foregoing objects outlined and with other objects in view which will appear as the description proceeds, the invention consists in the novel method and composition hereinafter described in detail, and more particularly pointed out in the appended claims.

In making up the improved composition, a mixture is made of approximately 80% finely powdered feldspar and approximately 20% of finely powdered soda ash. These two powdered substances are intimately mixed together.

The substances are preferably placed in a mixing machine and the machine is operated for about fifteen minutes. The substance is preferably put up in containers having sifting tops, so that the finely powdered material may be sifted onto the surface to be cleaned and polished. The feldspar being the base of enamel, will not scratch or dull the polish of a surface being cleaned, but will clean the surface and bring out the polish. The soda ash cuts any dirt or grease accumulated on the surface to be cleaned.

The preferred method of using the cleaner or composition, is to sift a small amount on a soft damp cloth and to then apply the cloth to the surface to be cleaned by rubbing the cloth on the surface until the same is cleaned. Then the surface is rinsed with clear water and the moisture is removed by wiping.

Attention is called to the fact that the materials used in the composition are ground as fine as it is possible to grind it, in order that there will be no liklihood of scratching any surface on which the composition is used.

It is apparent that any feldspar capable of producing the desired result may be used in the improved composition, and it has been found in practice that feldspar having the following ingredients in the stated proportions may be used with good results:—

Silica 59.40; alumina 80.76; iron oxide 1.22; lime 1.01; magnesia 9.94; potash 1.47 and soda 6.46.

From the foregoing it is believed that the improved method and composition will be readily understood by those skilled in the art, and it is evident that changes may be made in the steps of the method and in the character and proportions of the ingredients without departing from the spirit of the invention as expressed in the claims.

What is claimed and desired to be secured by Letters Patent is:

1. A composition of matter for use in cleaning and polishing porcelain, vitreous and like surfaces consisting of feldspar and soda ash in finely powdered condition.

2. A composition of matter for cleaning and polishing surfaces consisting of substantially 80% feldspar and substantially 20% soda ash, said feldspar consisting substantially of the following ingredients: silica 59.40, alumina 80.76, iron oxide 1.22, lime 1.01, magnesia 9.94, potash 1.47 and soda 6.46.

3. A composition of matter for use in cleaning and polishing surfaces consisting of substantially 80% feldspar in finely powdered condition, and substantially 20% soda ash in finely powdered condition.

In testimony whereof I affix my signature.

MARCY H. TROYER. [L. S.]